United States Patent [19]

Ohkubo

[11] Patent Number: 5,700,219

[45] Date of Patent: Dec. 23, 1997

[54] VEHICLE POWER TRANSMISSION MECHANISM

[75] Inventor: Masahiro Ohkubo, Kyoto, Japan

[73] Assignee: Exedy Corporation, Osaka, Japan

[21] Appl. No.: 678,027

[22] Filed: Jul. 10, 1996

[30] Foreign Application Priority Data

Jul. 21, 1995 [JP] Japan ................................. 7-186040

[51] Int. Cl.$^6$ ................................. F16H 47/08
[52] U.S. Cl. ................................. 475/47; 192/3.26
[58] Field of Search ................................. 475/60, 61, 62, 475/63, 64, 65, 47, 51; 192/3.26, 3.27, 48.3, 48.5

[56] References Cited

U.S. PATENT DOCUMENTS

| | | | |
|---|---|---|---|
| 1,949,816 | 3/1934 | Smith-Clarke | 475/47 |
| 2,324,733 | 7/1943 | Smirl | 475/47 |
| 2,891,640 | 6/1959 | Binder | 192/3.26 |
| 2,917,950 | 12/1959 | Duffield | 192/3.26 |
| 2,929,270 | 3/1960 | Tuck et al. | 475/47 |
| 3,041,892 | 7/1962 | Schjolin | 475/51 |
| 4,246,997 | 1/1981 | Tarumizu | |
| 4,584,891 | 4/1986 | Mori | |
| 4,813,300 | 3/1989 | Ohkubo | |
| 4,844,216 | 7/1989 | Fukushima | |
| 4,924,978 | 5/1990 | Ohkubo | |
| 4,942,779 | 7/1990 | Ohkubo | |
| 5,122,104 | 6/1992 | Ohkubo | |

*Primary Examiner*—Dirk Wright
*Attorney, Agent, or Firm*—Shinjyu Office of Patent Attorney

[57] ABSTRACT

A vehicle power transmission mechanism which is disposed between a vehicle engine and a transmission. The vehicle power transmission mechanism includes a hydraulic coupling that inputs a power from an engine and a planetary gear unit that decreases the output rotating speed of the hydraulic coupling and transmits the rotating speed to the transmission. The planetary gear unit includes a ring gear coupled to an output of the hydraulic coupling, a plurality of planetary gears which are meshed with the ring gear, a carrier that supports the plurality of planetary gears and are coupled to a member at a side of the transmission, and a sun gear which is meshed with the plurality of planetary gears. A brake unit selectively brakes the rotation of the sun gear. A direct coupled clutch unit is configured to selectively directly transmit power from the engine to the carrier of the planetary gear unit.

17 Claims, 13 Drawing Sheets

Fig. 13

| POSITION OF LEVER 56 | DIRECT CLUTCH 8 | BRAKE 7 | GEAR REDUCTION | CONDITION |
|---|---|---|---|---|
| Neutral | -- | -- | -- | Dry Clutch Engagement and Disengagement of Engine & Transmission |
| Hydraulic Mode (Down Position) | -- | ENGAGED | $1<(Za+Zr)/Zr<2$ | Acceleration: Torque transmitted from turbine to dry clutch undergoes speed reduction by planetary gears. Deceleration: Torque transmitted from dry clutch to turbine undergoes a speed increase due to planetary gears. |
| Direct Mode (Up Position) | ENGAGED | -- | 1 | Engine and dry clutch in direct engagement under both acceleration and deceleration. |

VEHICLE POWER TRANSMISSION MECHANISM

BACKGROUND OF THE INVENTION

1. Field of the Invention

The present invention relates to a power transmission mechanism for use between a transmission and an engine for selectively transmitting torque therebetween, and more particularly to a power transmission mechanism which includes a torque convertor-like hydraulic coupling device having a planetary gear device connected thereto.

2. Description of the Related Art

Small vehicles such as an inexpensive passenger car typically use an automatic transmission for transmitting power from an engine to the rear wheels of the car. The automatic transmission usually includes a torque convertor which allows the engine to idle when in gear but not in motion. The torque convertor transmits the power from the engine to the automatic transmission using an impeller and a turbine both of which are encased in a housing filled with a hydraulic fluid.

Some vehicles, such as trucks and buses, on the other hand, use a manual transmission, herein after referred to as a manual gear unit, for transmitting power between the engine and rear wheels of the vehicle. The manual gear unit includes a clutch mechanism which is actuated with the operation of a clutch pedal by a driver. When the clutch is disengaged, the gears in the manual gear unit may be changed or shifted by the driver.

In a vehicle using the above-described manual gear unit, the clutch mechanism must be gradually moved from a disengaged to an engaged position when putting the vehicle into motion. Operation of a clutch mechanism is troublesome for most drivers. Also, many drivers have trouble operating both the clutch and shifting gears when it is time to up-shift into a faster speed gear or down-shift to a slower speed gear. In particular, many drivers have trouble when trying to down-shift in order to use the engine as a braking device, for instance when the vehicle is going down a slope, it can be difficult to downshift and operate the clutch with the vehicle speed increasing as it rolls downhill.

Also, in the middle-sized or large-sized vehicle, when going down a slope, the foot brake is frequently operated which puts extreme demands on the brake lining, sometimes causing the brakes to overhead and/or fade. Either way, under such conditions the effectiveness of the brakes in the vehicle is reduced. In view of the demands on the brakes in such vehicles, recently, there has been provided an exhaust-gas brake unit which increases the braking capabilities of the engine. There has also been, in recent years, a compressed pressure release brake system used in vehicles which allows the escape of the compressed gas during an expansion stroke of an engine, in order to obtain a larger engine brake. However, some large vehicles, such devices do not provide sufficient braking power and therefore a hydrodynamic retarder unit is used. The hydrodynamic retarder unit obtains a brake force using the consumption of a kinetic energy due to a hydraulic operating fluid. An electric retarder unit which uses an eddy current may also be used. However, such retarder units produce a generally large amount of heat during usage because all of the brake energy is converted into heat, resulting in cooling capacity problems.

SUMMARY OF THE INVENTION

One object of the present invention is to use engine braking in a configuration having sufficient cooling capacity at a maximum engine braking to reduce heat value and to obtain a large brake force.

Another object of the present invention is to improve the operability of a manual gear transmission system with the elimination of the dry clutch operation when starting movement of a vehicle.

Still another object of the present invention is to improve the operability of a vehicle when shifting gears.

In one aspect of the present invention, a vehicle power transmission mechanism includes a hydraulic coupling unit having a turbine and an impeller, the impeller configured to transmit torque to the turbine from an engine coupled to the impeller via a hydraulic fluid. The vehicle power transmission mechanism also includes a planetary gear unit connected to the turbine, the planetary gear unit couplable to a transmission, the planetary gear unit configured to decrease an output rotating speed of the turbine and transmit the subsequent reduced rotating speed to the transmission.

Preferably, the planetary gear unit includes a ring gear connected to the turbine, a plurality of planetary gears which are meshed with the ring gear radially within the ring gear, a carrier that supports the plurality of planetary gears and is coupled to the transmission, and a sun gear which is meshed with the plurality of planetary gears radially within the plurality of planetary gears. Further, a brake unit is configured to selectively brake the rotation of the sun gear.

Preferably, a direct coupling clutch is connected to the turbine and is configured to selectively lock-up the turbine and the impeller such that the impeller and the turbine rotate as a single unit transmitting torque from the engine to the carrier of the planetary gear unit.

Preferably, the present invention includes a hydraulic control unit for controlling actuation of the brake unit and the direct coupled clutch unit.

Preferably, the hydraulic control unit includes a hydraulic pump which is driven by the rotation of the impeller, and a hydraulic control valve that controls the operation of the brake unit and the direct coupled clutch unit using hydraulic pressure generated by the hydraulic pump.

Preferably, the vehicle power transmission mechanism further includes a mechanical dry clutch operably disposed between the carrier of the planetary gear unit and the transmission, for selectively controlling transmittance of torque from the carrier to the transmission.

In one embodiment the transmission is a manual type transmission.

In another embodiment, the transmission is an automatic type transmission.

Preferably, a flexible plate is disposed between the engine and the hydraulic coupling unit.

Preferably, the impeller and the turbine of the hydraulic coupling unit each include impeller blades and turbine blades, respectively, that guide direction of fluid flow of the hydraulic fluid in response to relative rotation of the impeller and the turbine. The impeller blades are inclined in a negative direction with respect to a rotating direction of the impeller and the turbine and the turbine blades are inclined in a positive direction with respect to the rotating direction.

In another aspect of the present invention, a vehicle power transmission mechanism includes a hydraulic coupling unit having a turbine and an impeller, the impeller configured to transmit torque to the turbine from an engine coupled to the impeller via a hydraulic fluid. A planetary gear unit is connected to the turbine. The planetary gear unit is couplable to a manual transmission. The planetary gear unit configured to decrease an output rotating speed of the turbine and transmit the rotating speed to the manual transmission. A mechanical dry clutch is operably disposed between the planetary gear unit and the manual transmission, for selectively controlling transmittance of torque from the planetary gear unit to the manual transmission Preferably, the planetary gear unit includes a ring gear connected to the turbine, a plurality of planetary gears which are meshed with the ring gear radially within the ring gear, a carrier that supports the plurality of planetary gears and is coupled to the transmission, and a sun gear which is meshed with the plurality of planetary gears radially within the plurality of planetary gears, and a brake unit configured to selectively brake the rotation of the sun gear.

Preferably, a direct coupling clutch is connected to the turbine and is configured to selectively lock-up the turbine and the impeller such that the impeller and the turbine rotate as a single unit transmitting torque from the engine to the carrier of the planetary gear unit.

Preferably, a hydraulic control unit is provided for controlling actuation of the brake unit and the direct coupled clutch unit.

Preferably, the hydraulic control unit includes a hydraulic pump which is driven by the rotation of the impeller, and a hydraulic control valve that controls the operation of the brake unit and the direct coupled clutch unit using hydraulic pressure generated by the hydraulic pump.

Preferably, the hydraulic control unit is connected to a vehicle speed sensor, an idle switch and a mechanical mode switch having at least two positions, a first position for indicating a direct operation mode and a second position for indicating a hydraulic operation mode, and the hydraulic control unit controls engagement and disengagement of the brake unit and the direct coupled clutch unit in response to conditions sensed by the vehicle speed sensor and the idle switch and the position of the mechanical mode switch.

Alternatively, the hydraulic control unit is connected to a vehicle speed sensor, a mechanical mode switch having at least two positions, a first position for indicating a direct operation mode and a second position for indicating a hydraulic operation mode and an ascend/descend switch having two positions, a first position indicating an ascending mode and a second position indicating a descending mode, and wherein the hydraulic control unit controls engagement and disengagement of the brake unit and the direct coupled clutch unit in response to conditions sensed by the vehicle speed sensor, the position of the mechanical mode switch and the position of the ascend/descend switch.

Alternatively, the hydraulic control unit is connected to a vehicle speed sensor, a brake switch and a mechanical mode switch having at least two positions, a first position for indicating a direct operation mode and a second position for indicating a hydraulic operation mode, and wherein the hydraulic control unit controls engagement and disengagement of the brake unit and the direct coupled clutch unit in response to conditions sensed by the vehicle speed sensor and the idle switch and the position of the mechanical switch.

Preferably, the impeller and the turbine of the hydraulic coupling unit each include impeller blades and turbine blades, respectively, that guide direction of fluid flow of the hydraulic fluid in response to relative rotation of the impeller and the turbine, wherein the impeller blades are inclined in a negative direction with respect to a rotating direction of the impeller and the turbine and the turbine blades are inclined in a positive direction with respect to the rotating direction.

In the above vehicle power transmission mechanism, in a neutral state where neither the brake unit nor the direct coupled clutch unit is operated, the power of the engine is not transmitted to the transmission.

In the hydraulic mode where the brake unit is engaged, and the direct coupled clutch unit is not engaged, the power from the engine is transmitted to the planetary gear unit through the hydraulic coupling at the normal drive time, so as to be decreased in speed by the planetary gear unit and outputted to the transmission. In this case, since the transmission of the power is conducted through the hydraulic coupling, the troublesome dry clutch engagement operation becomes unnecessary, for example, at the time of starting motion of the vehicle. Also, during deceleration, the rotation from the transmission is increased in speed by the planetary gear unit and then transmitted to a turbine. The engine brake force is increased by as much as the rotation is increased in speed during acceleration. Also, compared with a prior art retarder unit, since all the rotation of a rotor is converted into heating in the retarder unit, the heat value becomes very large. On the contrary, in the structure of the present invention, since the heat value is generated in accordance with the difference in speed between the turbine and the impeller, the heat value is smaller.

Furthermore, in the case where the direct coupled clutch is operated without any operation of the brake unit (direct mode), the power from the engine is transmitted to the carrier of the planetary gear unit through the direct coupled clutch, and then transmitted to the transmission. In other words, the power from the engine is directly transmitted to the transmission.

In the vehicle power transmission according the present invention, the impeller and the turbine include a blades that direct fluid flow. The blade of the impeller is inclined in a negative direction with respect to a rotating direction whereas the blade of the turbine is inclined in a positive direction with respect to the rotating direction thereof. In this case, in the hydraulic coupling, the decelerating drive region can be set to be higher in capacity than the forward drive region. In this case, since the capacity of the hydraulic coupling becomes small in a low-speed rotation region when starting the vehicle or the like, an engine stalling at idle speeds can be prevented. Since the capacity of the hydraulic coupling becomes large when effecting the engine brake in a high-speed rotation region, even when a difference of rotation between the impeller and the turbine is small, the hydraulic coupling can absorb an engine brake torque.

The above and other objects and features of the present invention will be more apparent from the following description taken in conjunction with the accompanying drawings.

BRIEF DESCRIPTION OF THE DRAWINGS

FIG. 13 is a diagram showing conditions during a Hydraulic Mode of operation, a Direct Mode of operation and a neutral state.

DETAILED DESCRIPTION OF THE PREFERRED EMBODIMENTS

Now, a description will be given in more detail of the embodiments of the present invention with reference to the accompanying drawings.

FIRST EMBODIMENT

Figure 1:
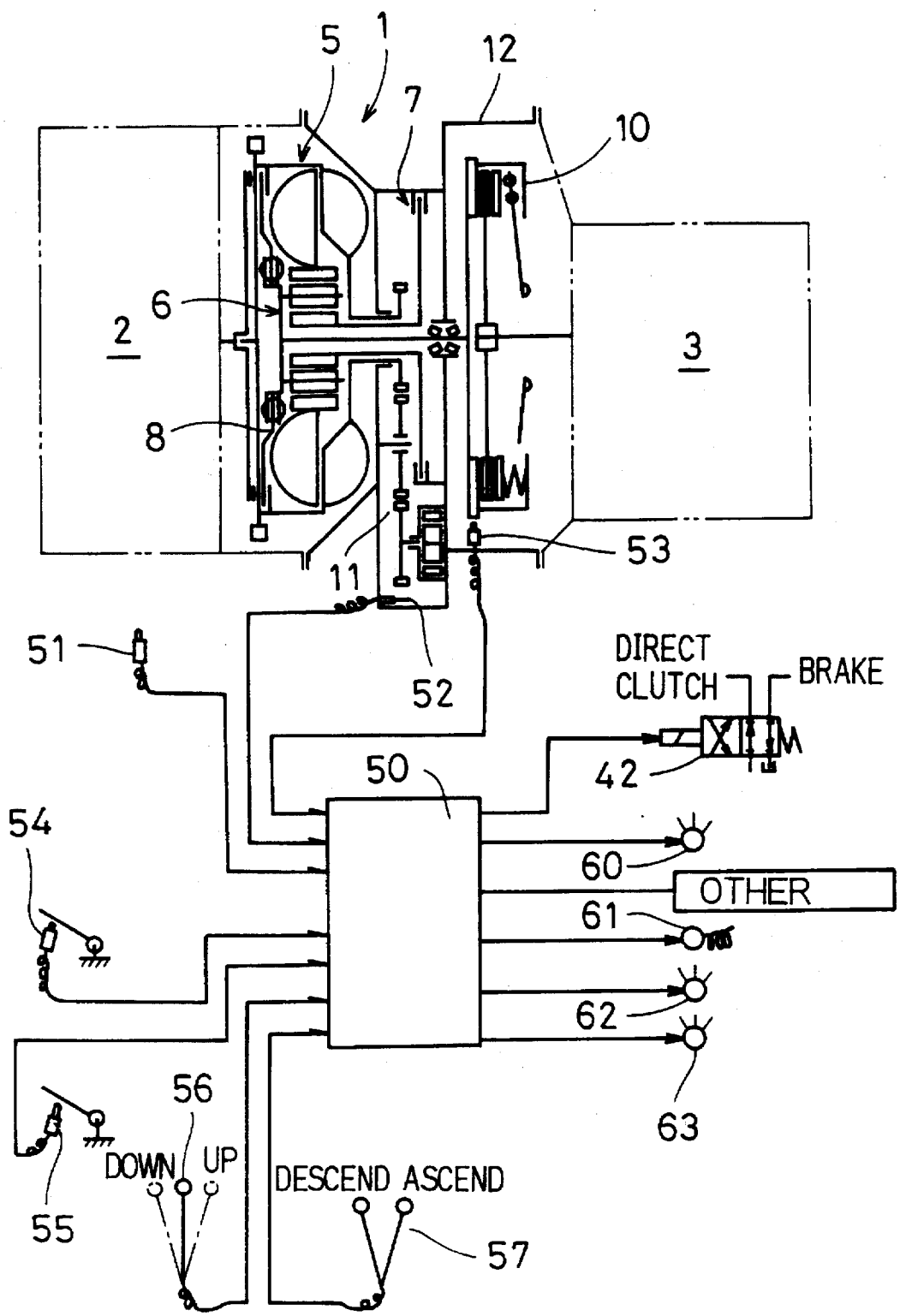
FIG. 1 is a schematic block diagram showing a power transmission mechanism connected to an engine, a manual transmission and a control unit in accordance with a first embodiment of the present invention.

A power transmission mechanism 1 shown in FIG. 1 is disposed between an engine 2 and a manual gearbox 3, herein after referred to as a manual transmission 3. The power transmission mechanism includes: a hydraulic coupling 5 to which a power is inputted from the engine 2; a planetary gear unit 6 that decreases the output rotating speed of the hydraulic coupling 5 prior to transmittance to the manual transmission 3; a brake unit 7; and a direct coupling clutch unit 8 for directly transmitting the power from the engine 2 to the manual transmission 3.

The power transmission mechanism 1 includes a dry clutch unit 10 disposed between the output of the planetary gear unit 6 and the manual transmission 3, and a hydraulic control unit 11 for actuating the brake unit 7 and the direct coupling clutch unit 8. These respective mechanisms are accommodated in a housing 12 and each is described in greater detail below.

The Hydraulic Coupling

Figure 2:
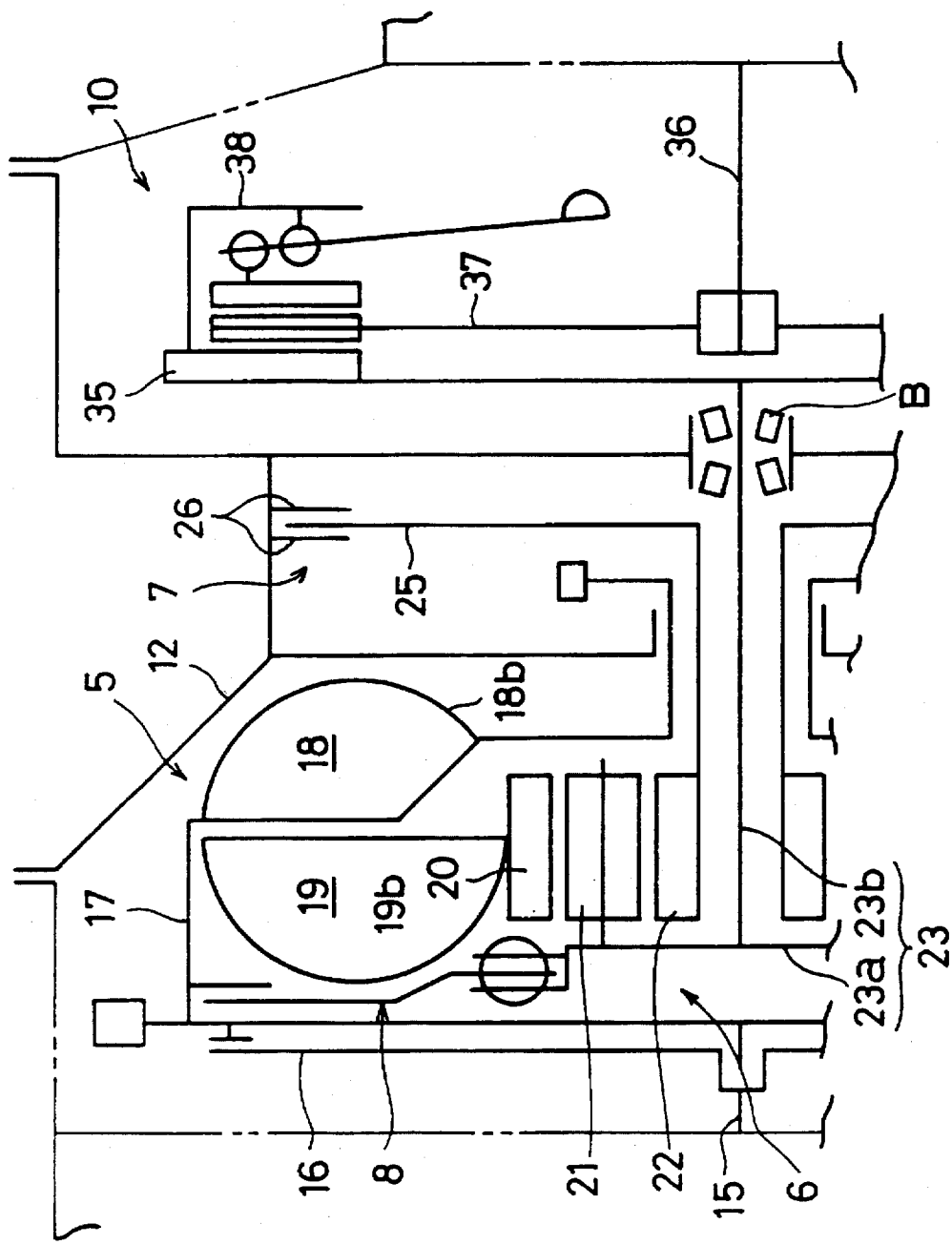
FIG. 2 is a fragmentary, enlarged schematic diagram showing a portion of the power transmission mechanism depicted in FIG. 1.
Figure 7:
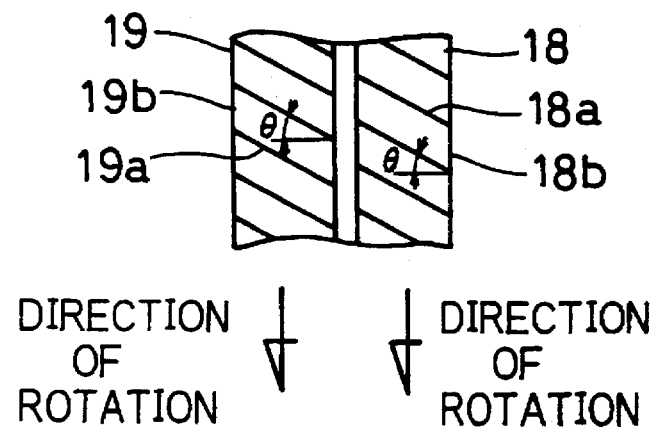
FIG. 7 is a fragmentary side cross-sectional view of an impeller and a turbine of a hydraulic coupling mechanism in the power transmission mechanism of the present invention.

The hydraulic coupling 5 is shown in FIG. 2 on a slightly enlarged scale. The hydraulic coupling 5 includes an impeller 18 fixed to a front cover 17. The front cover 17 is fixed to a flexible plate 16 which is connected to a crankshaft 15 of the engine 2. A turbine 19 is disposed within the front cover 17 opposite the impeller 18. The turbine 19 is couplable to the impeller 18 through movement of a hydraulic operating fluid (not shown) which fills the front cover 17. The impeller 18 is rotatable with respect to the housing 12. The impeller 18 and the turbine 19 include, on an impeller shell 18b and a turbine shell 19b, a plurality of blades 18a and 19a that control fluid flow direction, respectively, as shown in FIG. 7. The respective blades 18a and 19a are arranged such that the impeller blade 18a is inclined in a negative direction and the turbine blade 19a is inclined in a positive direction, by an angle θ with respect to the rotating direction, as shown in FIG. 7.

Planetary Gear Unit

The planetary gear unit 6 includes, as shown in FIG. 2, a ring gear 20 coupled to the turbine 19 of the hydraulic coupling 5, a plurality of planetary gears 21 having gear teeth (not shown) which are meshed with corresponding gear teeth in the ring gear 20, and a cylindrical sun gear 22 which is arranged centrally and also has gear teeth (not shown) which are meshed with the planetary gears 21. The respective planetary gears 21 are coupled to each other through a carrier 23. The carrier 23 includes a coupling portion 23a that couples the respective planetary gears 21 to each other, and a shaft portion 23b that extends toward the manual transmission 3 from the center of the coupling portion 23 so as to penetrate the central portion of the sun gear 22. It should be understood that the coupling portion 23 could be in the form of an annular plate member having a plurality of shafts extending therefrom which support the planetary gears 21, with a shaft extending from the center of the annular plate, or other similar structure. The shaft portion 23b is rotatably supported by the housing 12 by the bearings B, and has an output end portion which is connected to the input side of the dry clutch unit 10.

The sun gear 22 is connected to a disc 25. The sun gear 22 and the disk 25 are configured to be freely rotatable about the shaft portion 23b. For instance, the sun gear 22 and disc 25 may include a hollow shaft through which the shaft portion 23b extends. The sun gear 22 and disc 25 may be prevented from rotating by the brake unit 26, as is described in greater detail below.

In the above described configuration, in the planetary gear unit 6, the number of teeth of the ring gear 20 is Zr, and the number of teeth of the sun gear 22 is Za. Further, the reduction gear ratio i is represented by the equation:

$$i = \frac{Za + Zr}{Zr}$$

As well, ideally the planetary gear unit 6 acts a speed reducing mechanism and therefore it is desirable for the following relationship to be true:

$$Za < Zr$$

and the reduction gear ratio i satisfies the equation:

$$1 < i < 2.$$

Brake Unit

The brake unit 7 is for braking the rotation of the sun gear 22 of the planetary gear unit 6, and includes a pair of friction pads 26 that brake the rotation of the disc 25 that connected to the sun gear 22. The disc 25 is interposed between the friction pads 26. The paired friction pads 26 are actuated by a hydraulic pressure to selectively engage and stop rotation of the disc 25.

Direct Coupled Clutch Unit

Figure 3:
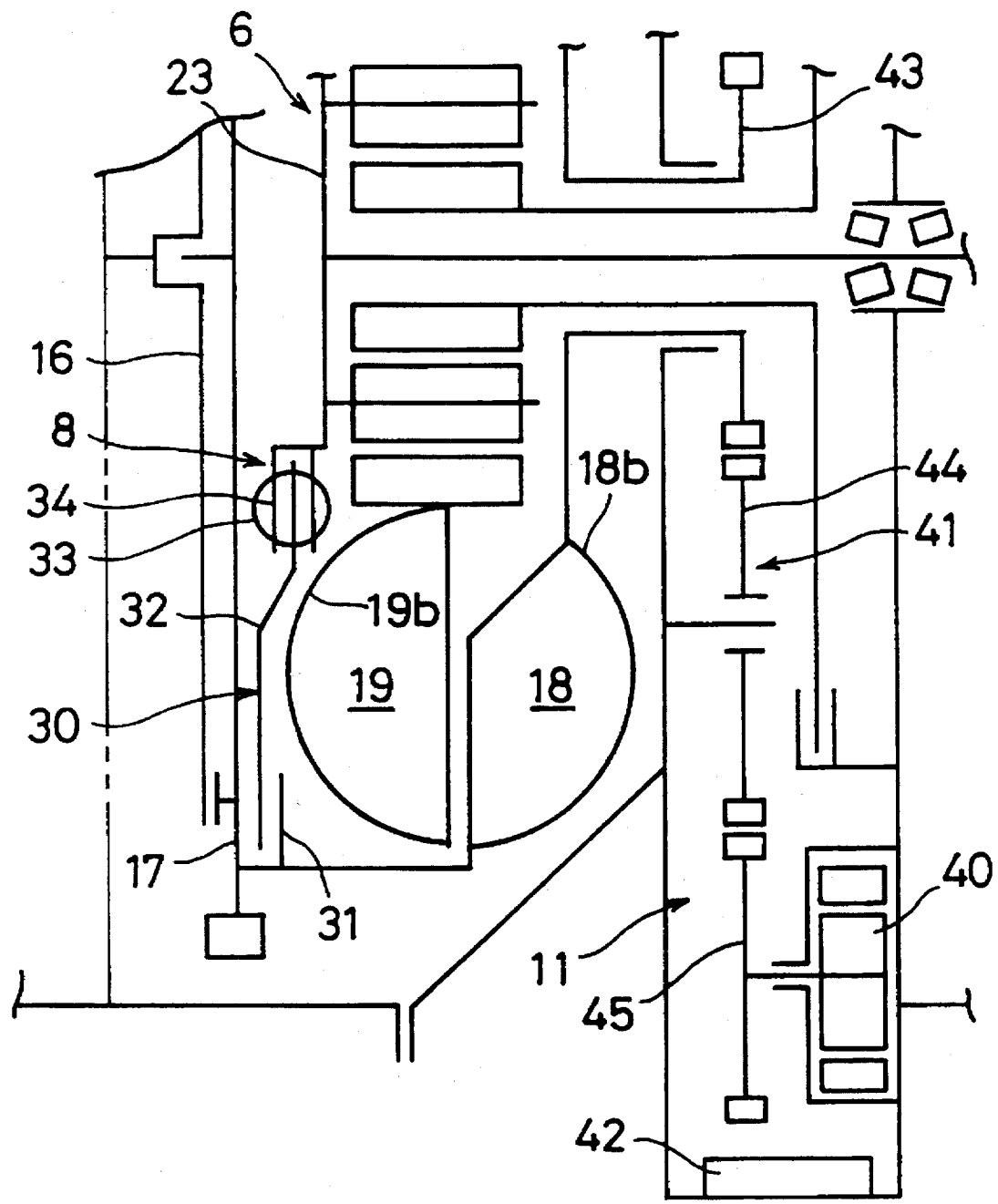
FIG. 3 is a fragmentary, schematic diagram showing another portion of the power transmission mechanism depicted in FIGS. 1 and 2.

The direct coupling clutch unit 8, as shown in FIG. 3, includes a clutch disc 30 having a friction member in a outer periphery thereof, and a piston 31 supported on the front cover 17 that presses the friction member of the clutch disc 30 against the front cover 17. The piston 31 is so designed as to be actuated by a hydraulic pressure. The clutch disc 30 includes a disc-shaped input plate 32 fitted with a friction member in its outer periphery, and an output plate 34 elastically coupled to the input plate 32 through a torsion spring 33. The output plate 34 is coupled to the carrier 23 of the planetary gear unit 6.

Dry Clutch Unit

The dry clutch unit 10 is for selectively transmitting torque between the planetary gear unit 6 and the manual transmission 3. The dry clutch unit 10 includes, as shown in FIG. 2, a flywheel 35 connected to the output end portion of the carrier 23 of the planetary gear unit 6, a clutch disc 37 coupled to an input shaft 36 of the manual transmission 3, and a clutch cover unit 38 for pressing the clutch disc 37 toward the flywheel 35. The clutch unit 10 is engaged and disengaged by a release mechanism not shown.

Hydraulic Control Unit

The hydraulic control unit 11 includes, as shown in FIG. 3, a hydraulic pump 40, a pump drive gear train 41 for driving the hydraulic pump 40, and a hydraulic control valve 42 for driving the brake unit 7 and the piston 31 of the direct coupling clutch unit 8 by a hydraulic pressure generated by the hydraulic pump 40. The pump drive gear train 41 includes a pump drive gear 43 that rotates together with the impeller 18, an idler gear 44 which is meshed with the pump drive gear 43, and a pump driven gear 45 which is meshed with the idler gear 44 and fixed to the rotor of the pump 40. It should be noted that the hydraulic operating oil within the power transmission mechanism 1 is cooled by an oil cooler not shown.

Control Block

As shown in FIG. 1, the power transmission mechanism 1 includes a control unit 50. The control unit 50 includes a microcomputer having CPU, RAM, ROM and so on. The control unit 50 is connected with a vehicle speed sensor 51, a hydraulic temperature detecting sensor 52 that detects hydraulic temperature within the power transmission mechanism 1, and an output r.p.m. detecting sensor 53 that detects the output r.p.m. of the power transmission mechanism 1. Also, the control unit 50 is connected with an idle switch 54 that detects whether an accelerator control of the engine 2 is engaged or not and a brake switch 55 that detects whether a brake pedal is engaged or not. The control unit 50 is also connected to the respective switch outputs of a transmission mode lever 56 manipulated by the operator of the vehicle equipped with the present invention. The transmission mode lever 56 changes the state of the direct coupling clutch unit 8 and the state of the brake unit 7. For instance, in the Up position shown in FIG. 1, the transmission mode lever 56 indicates that a direct transmission state has been selected where a vehicle operator desires the direct coupling clutch unit 8 to be engaged and the brake unit 7 be dis-engaged so there is direct torque transmission from the engine 2 to the transmission 3 via the dry clutch unit 10. The direct transmission state will hereinafter be referred to as the Direct Mode. In the Down position, also shown in FIG. 1, the transmission mode lever 56 indicates that a driver desires that the direct coupling clutch unit 8 be dis-engaged and the brake unit 7 be engaged so that the impeller 18 directs fluid toward the turbine 19 and the movement of fluid from the impeller 18 toward the turbine 19 causes transmission of torque from the engine 2 to the transmission 3 via the dry clutch unit 10. The mode corresponding to the Down position will hereinafter be referred to as the Hydraulic Mode.

The control unit 50 is also connected to the respective switch outputs of a mode change-over lever 57 which is also operator controlled. The mode change-over lever 57 has two settings, a Descending Mode and an Ascending Mode. For instance, in the Descending Mode, the driver of the vehicle (not shown) may be going downhill an requires that the engine provide braking power. The driver would select the Ascending Mode when going uphill.

Further, the control unit 50 is connected with a solenoid of the control valve 42 that independently controls actuation of the either or both of the brake unit 7 and the direct coupling clutch unit 8. The control unit 50 is further connected to several indicator lamps for the operator's benefit, such as a down shift indicator lamp 60, an engine over-run alarm buzzer 61, a hydraulic temperature alarm lamp 62 indicating the rising of the hydraulic temperature, an error lamp 63 indicating errors in the respective sensors, the switch, the solenoid or the like, and other input/output portions.

Operation

In the present invention, FIG. 13 shows the relationships between the position of the transmission mode lever 56, the actuation/non-actuation of the brake unit 7 and the direct coupling clutch unit 8, corresponding reduction gear ratio and the torque transmission mode. Referring to FIG. 13, the operation of the present invention will be described.

1) Beginning motion and moving at low speeds:

When starting movement from a stop and moving at low speeds, in general, the brake unit 7 is engaged (actuated), and the direct coupling clutch unit 8 is dis-engaged (not actuated). This is a hydraulic torque transmission state where torque is transmitted from the engine 2 to the dry clutch 10 via the fluid movement between the impeller 18 and the turbine 19 hereinafter referred to as a Hydraulic Mode.

In the Hydraulic Mode, torque from the engine 2 is outputted through the flexible plate 16 and the hydraulic coupling 5 and from there through the turbine 19 to the planetary gear unit 6. In the planetary gear unit 6, the speed of rotation of the turbine 19 is decreased by the reduction gear ratio i, and its output is transmitted to the clutch unit 10.

In this example, since the power is transmitted using the hydraulic coupling 5, in particular when starting the vehicle, the clutch operation is not required as in the case of the automatic change gear unit, and the smooth start is enabled without any troublesome operation such as a half-clutching operation where a clutch is only partially engaged.

2) Normal Operation (mid-speed/high speed):

During normal operations, at medium and high speeds, the brake unit 7 is dis-engaged (not actuated), and the direct coupling clutch unit 8 is engaged (actuated). This condition is a direct torque transmission state, and will hereinafter be referred to as Direct Mode. In the Direct Mode, torque from the engine 2 is directly transmitted to the clutch unit 10 through the flexible plate 16 and the direct coupling clutch unit 8.

In the conventional power transmission mechanism using a hydraulic coupling, the transmission efficiency of the power is degraded by slip between the drive side and the driven side (i.e. slip between an impeller and a turbine). Also, at high-speeds, there arises problems such as the torque cannot be transmitted sufficiently. However, in the present invention, the Direct Mode during normal running, eliminates the above mentioned drawback that occurs when using prior art hydraulic couplings.

3) Deceleration (Engine Braking):

When intending to decrease the speed or going down a slope, the present invention operates in the Hydraulic Mode.

Typically when going down hill, or decelerating, a driver does not press on the accelerator of the engine 2, and the speed of the engine 2 decreases and, in effect, torque is inputed into the power transmission mechanism 1 from the manual transmission 3 due to the dominating speed of the vehicle equipped with the present invention. Consequently, the rotation of the dry clutch unit 10 drives the power transmission mechanism 1 and the engine 2 may act as a brake to slow the vehicle down. In this case, the rotation of the sun gear 22 is stopped by engagement of the brake unit 7 and the rotational speed transmitted from the manual transmission 3 through the dry clutch 10 and sun gears 22 is increased in speed as much as the reduction gear ratio i of the planetary gear unit 6, and the torque transmitted to the turbine 19 includes the corresponding increase in rotational speed. In this situation, compared with other rotating parts, only the turbine 19 over-runs as much as the increased speed. A reverse drive force when braking is transmitted from the turbine 19 to the impeller 18 through the hydraulic operating fluid so that the impeller 18 is rotated by the turbine 19.

The engine 2 provides a braking force due to its relative slow rotational speed and the braking force acts on the impeller 18 to slow the rotational speed of the turbine 19. The reduction gear ratio of the planetary gear unit 6 has the effect of multiplying the braking force of the engine by as much as the reduction gear ratio i.

Figure 4:
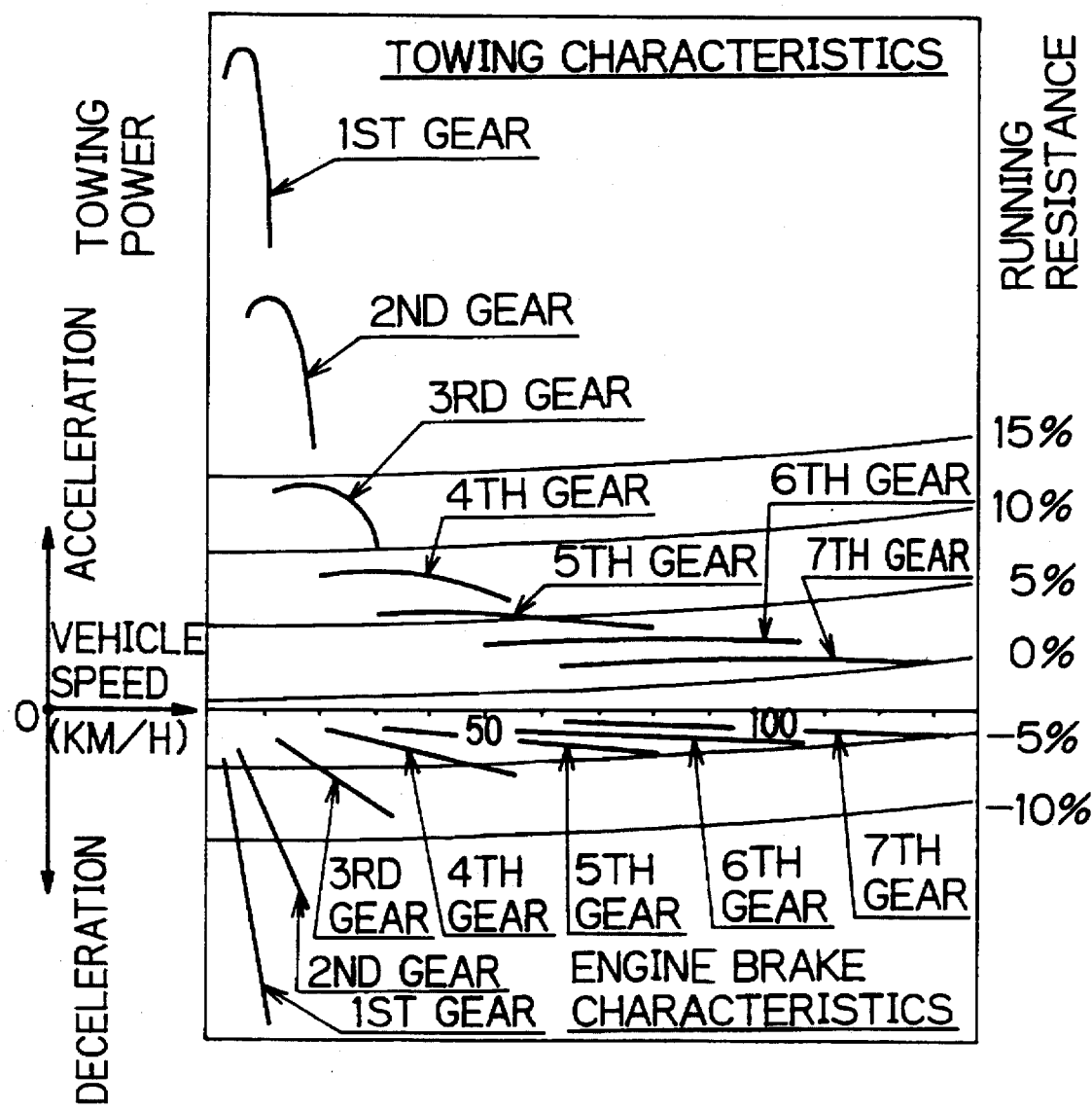
FIG. 4 is a graph showing a representation of the power transmission performance of the power transmission mechanism depicted in FIGS. 1, 2 and 3, specifically showing the performance characteristics for seven manual gears, for each gear representation is shown for both acceleration and deceleration.
Figure 5:
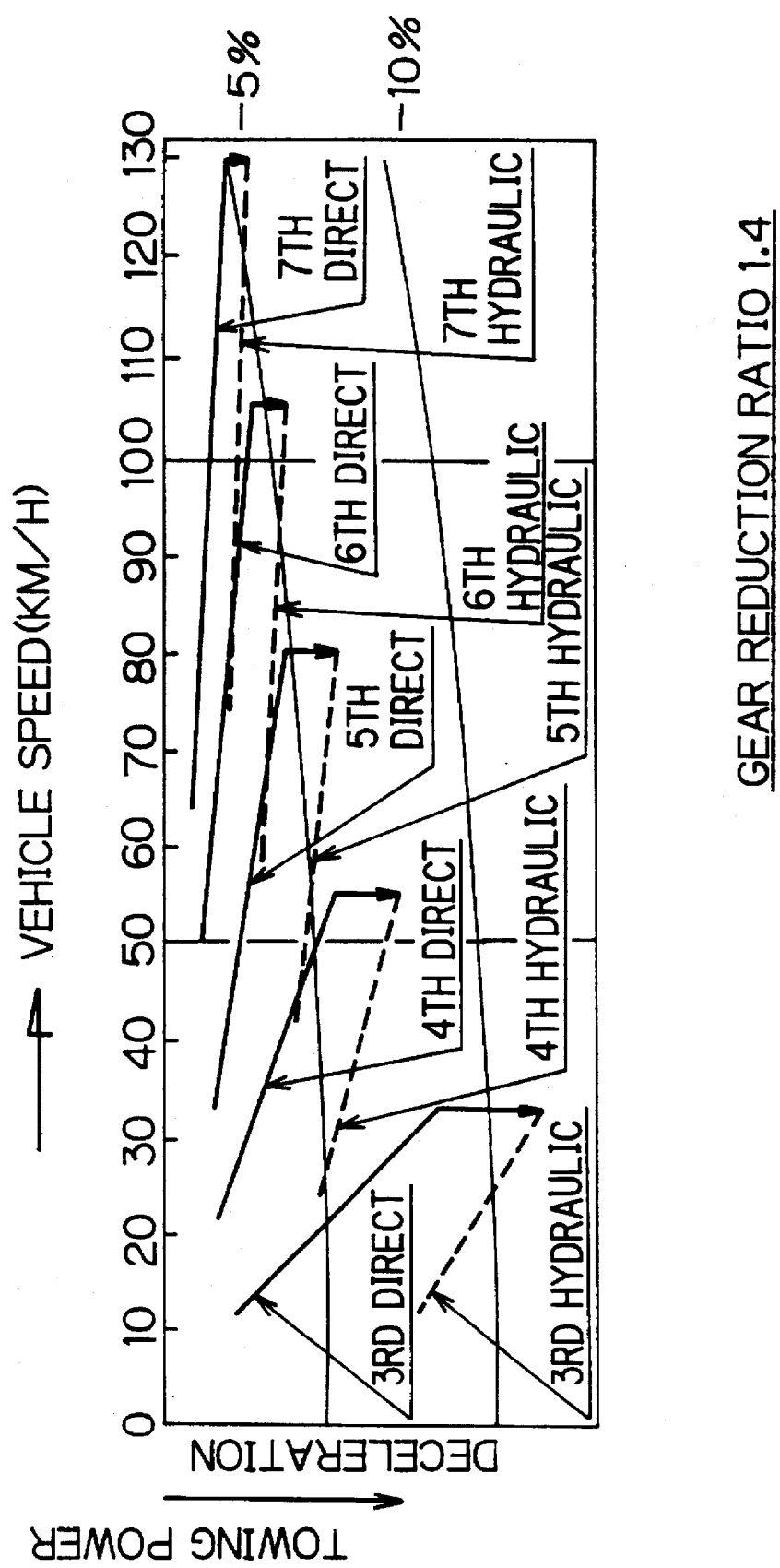
FIG. 5 is a graph of a portion of FIG. 4 on a slightly enlarged scale, showing the performance characteristics of gears three (3) through seven (7) during deceleration.

The increase of the engine brake in this case will be described with reference to FIGS. 4 and 5. It should be noted that FIG. 4 is diagram showing performance characteristics of the present invention for both acceleration and engine braking characteristics for the power transmission mechanism 1 where the manual transmission 3 has at least 7 forward gear speeds. FIG. 5 is an enlarged diagram showing only a portion of FIG. 4 showing only the engine braking characteristics of the third gear speed through the seventh gear speed. For the data presented in FIGS. 4 and 5, the reduction gear ratio i of the planetary gears 21 is pre-set to 1.4.

In FIG. 5, the engine braking characteristics shown with solid lines represent the responses in the Direct Mode where the gear reduction ratio i is 1 (corresponding to the bottom row of FIG. 13). When in the Hydraulic Mode (corresponding to the middle row of FIG. 13), the brake force of the engine 2 is increased as much as the reduction gear ratio 1 of the planetary gear unit 6 as described above, thereby obtaining the characteristic shown with a broken lines or dashed lines in FIG. 5.

In a prior art retarder mechanism used to provide braking force, where the retarder mechanism includes a stator fixed in the retarder mechanism housing, and a turbine member, the r.p.m. of the turbine member of the retarder mechanism usually produces a substantial amount heating because the turbine member is rotating adjacent to the non-rotating stator. However, in the present invention, during deceleration the turbine 19 may be rotating at an extreme rate but the adjacent impeller 18 is rotating at the rate of the engine 2. Therefore, the speed of the turbine 19 relative to the impeller 18 is as follows:

*turbine relative speed=(rpm of the turbine)−(rpm of the engine)*

The turbine relative speed, as defined above, is typically much less than the speed of a turbine member in a prior art retarder upon deceleration. Therefore, the heat generated in the present invention by the turbine 19 in the Hydraulic Mode during deceleration is much less that the head generated by a prior art retarder with similar braking capabilities.

It should be noted that the change-over of from the Direct Mode to the Hydraulic Mode is effected in a relatively short period of time, about 0.2 to 0.5 seconds since an electric signal is produced by the control unit 50 that causes the control valve 42 to control the hydraulic fluid pressure to the appropriate portion of the present invention.

4) Ascending:

When going up a slope, the vehicle usually travels using the direct coupling clutch unit 8. In this case, when a driver feels a need of a little higher power, he may desire use of the Hydraulic Mode. In this example, the torque is increased as much as the reduction gear ratio i of the planetary gear unit 6.

Hydraulic Coupling Characteristics

In the present invention, the braking force of the engine is an important feature, especially at high speeds. Further it is also important that, in the Hydraulic Mode, when starting movement of the vehicle from a stop, the capacity C of the hydraulic coupling must be such that the engine does not stall at idling speed. In the Hydraulic Mode when the engine is running at a generally high RPM, it is desirable for the engine to provide a significant level of brake torque. Hence, as shown in FIG. 6, the capacity C for engine braking during deceleration (where the engine provides braking torque) is greater than during acceleration.

Figure 6:
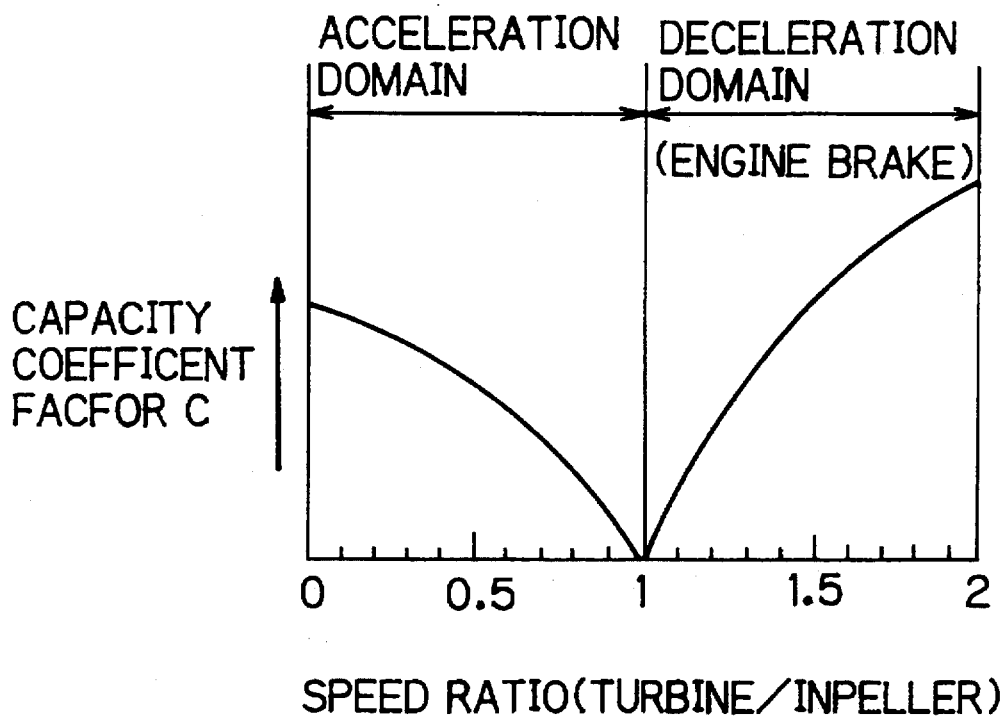
FIG. 6 is a diagram showing a graphical representation of the capacity coefficient factor C of a hydraulic coupling of the present invention in both acceleration and deceleration operations.

In order to accomplish the response characteristics shown in FIG. 6, it is necessary for the turbine and impeller blades of the present invention to be configured accordingly. In the power transmission mechanism of the present invention, as shown in FIG. 7, the blades 18a of the impeller 18 are inclined in a negative direction with respect to the rotation direction thereof, and the blade 19a of the turbine 19 is inclined in a positive direction with respect to the rotation direction thereof, by an angle of θ, respectively.

Control Operation

The operations relating to control of the present invention will be described with reference to the flowcharts in FIGS. 8 to 12. Generally, all control of the present invention is effected by the control unit 50 in response to various sensor inputs, as described above.

Figure 8:
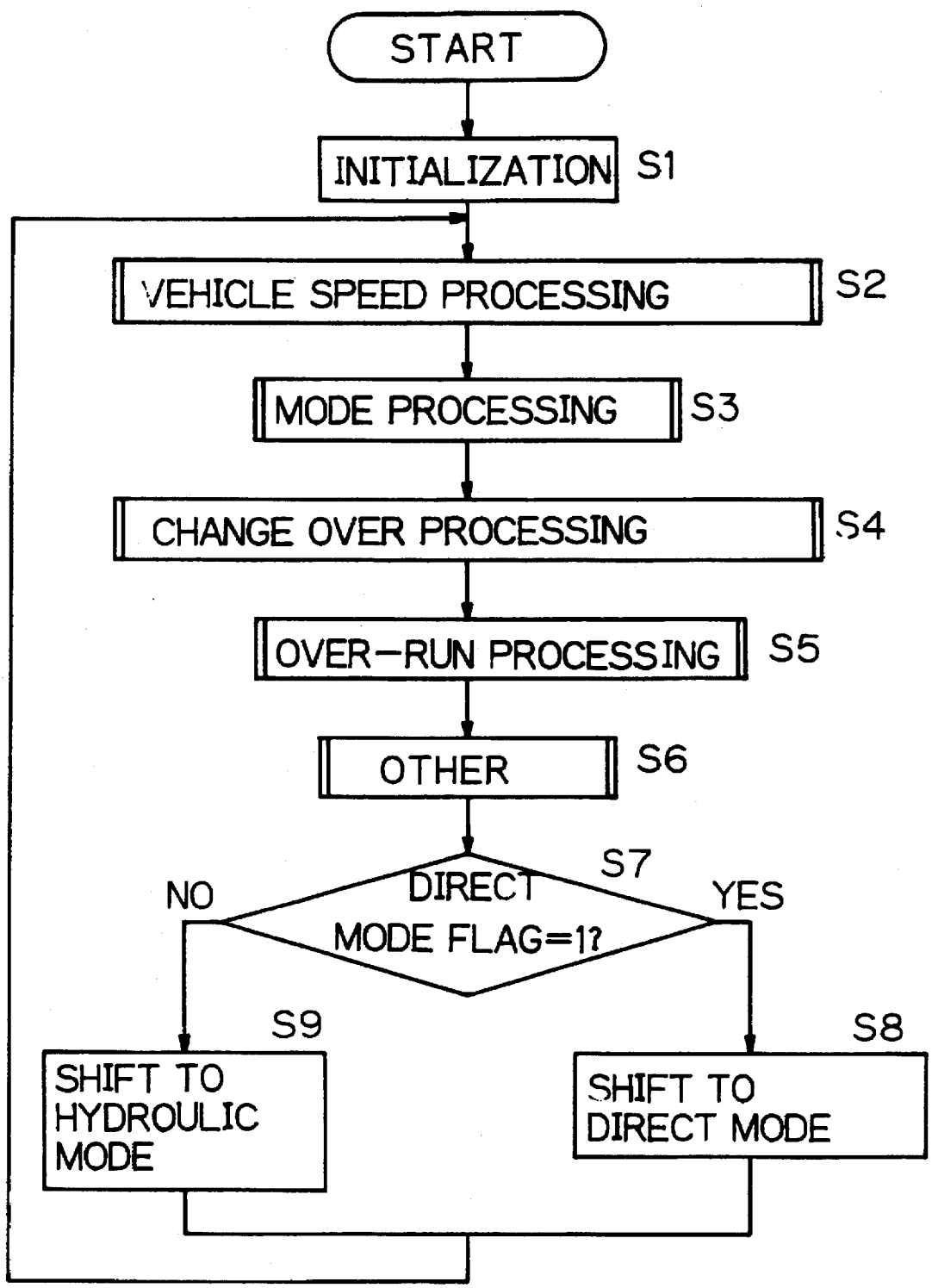
FIG. 8 is a flowchart showing the general operational control steps for the power transmission mechanism of the present invention, the steps including several subroutines.

When the ignition key of the vehicle equipped with the present invention is turned on, an initialization setting occurs at step S1 in FIG. 8. In the initialization setting, processing such as resetting of a plurality of control flags are conducted, the control flags described in greater detail below.

Then, a vehicle speed control processing is executed at step S2, Mode processing for recognizing which transmission mode is selected is executed at step S3, a change-over control processing is executed at step S4, an over-run control processing is executed at step S5, and other control processing are executed at step S6. The vehicle speed control processing procedure is shown in detail in FIG. 9. The Mode processing procedure is shown in detail in FIG. 10. The change-over control processing procedure is shown in detail in FIG. 11. The over-run procedure is shown in detail in FIG. 12.

Returning to FIG. 8, at step S7, it is judged whether a Direct Mode flag has been set by the respective control processing to be "1" or not. When the Direct Mode flag is "1", the process is shifted from step S7 to step S8. At step S8, a signal is sent out to the solenoid of the hydraulic control valve 42 so that the direct coupling clutch unit 8 is engaged and the brake unit 7 is dis-engaged. As a result, operation of the present invention is in the Direct Mode in such a manner that a power from the engine is transmitted to the manual transmission 3 side through the direct coupling clutch unit 8. On the other hand, when the direct coupled flag is "0" in step S7, the process is shifted from step S7 to step S9. In this situation, the control unit 50 sends a signal to the solenoid of the hydraulic control valve 42 that the direct coupling clutch unit 8 is dis-engaged and the brake unit 7 is engaged. As a result, the present invention operates in the Hydraulic Mode, whereby the power from the engine is transmitted to the manual transmission 3 side through the hydraulic coupling 5 and the planetary gear unit 6.

Figure 9:
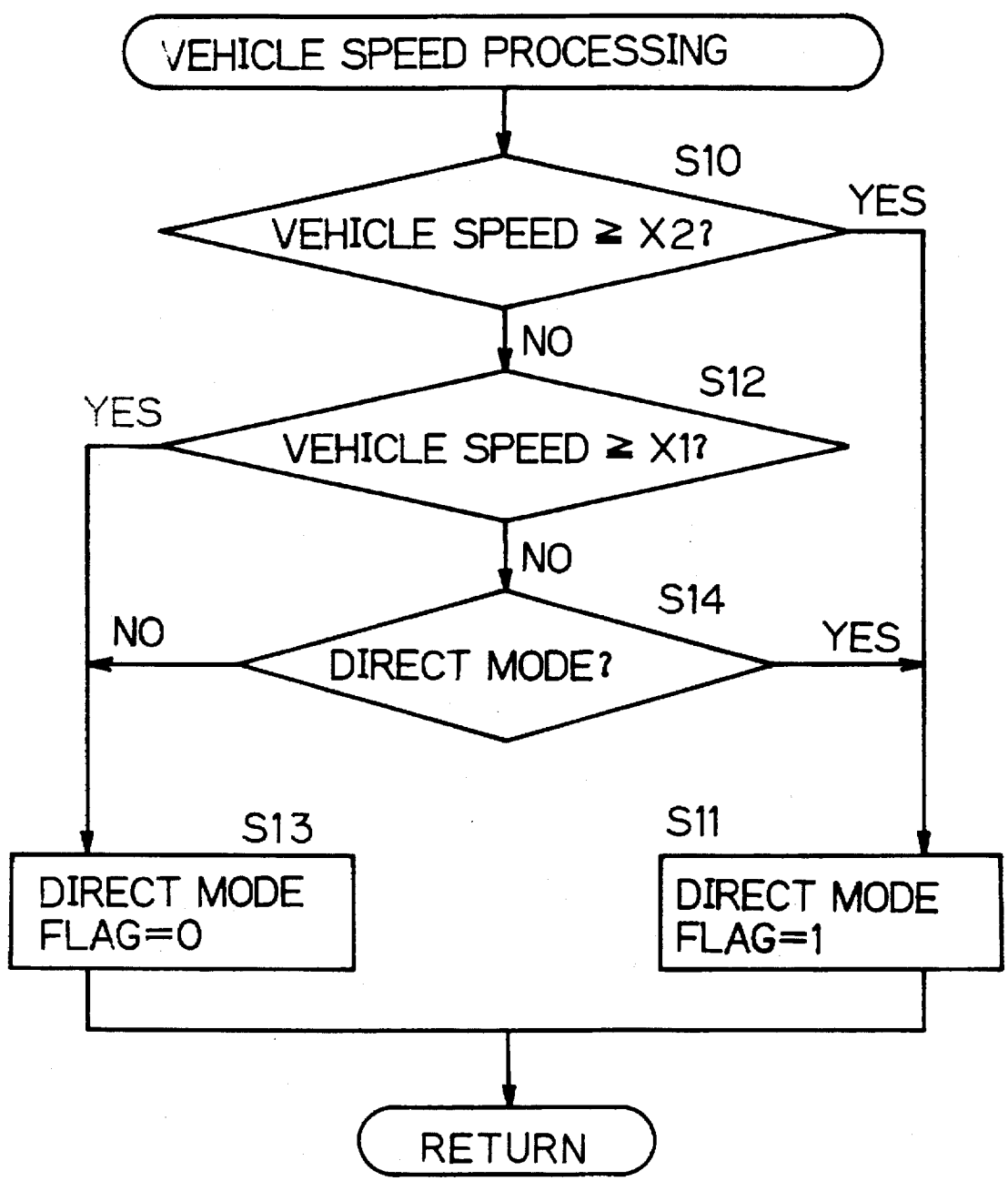
FIG. 9 is a flowchart of a Vehicle Speed Processing subroutine from called during the control steps represented in FIG. 8.

In the vehicle speed control processing S2, as shown in FIG. 9, it is first determined at step S10 whether the vehicle speed is equal to or greater than X2, or less than X2, X2 being a predetermined value. When the vehicle speed is greater than or equal to X2, the process is shifted from step S10 to step S11, thereby setting the Direct Mode flag to "1". When the vehicle speed is less than X2, the process is shifted from step S10 to step S12. At step S12, it is determined whether the vehicle speed is lower than X1 (X1<X2), or not, X1 being another predetermined value. When the vehicle speed is lower than X1, the process is shifted from step S12 to step S13, thereby setting the Direct Mode flag to "0". Also, in the case where the vehicle speed is X1 or higher, that is, in the case where the vehicle speed is between X1 and X2, the process is shifted from step S12 to step S14, and it is determined at step S14 whether operations are currently in the Direct Mode or not. In the event of the Direct Mode, the process is shifted to step S11, to set the Direct Mode flag to "1", but in the event that operation is currently not in the Direct Mode, the Direct Mode flag is set to "0" in step S13.

Through such a vehicle speed control processing, determinations are made to automatically change over operation to the Hydraulic Mode when the vehicle is at low speed of lower than X1, and to the Direct Mode when the vehicle is at middle or high speed higher than X2.

Figure 10:
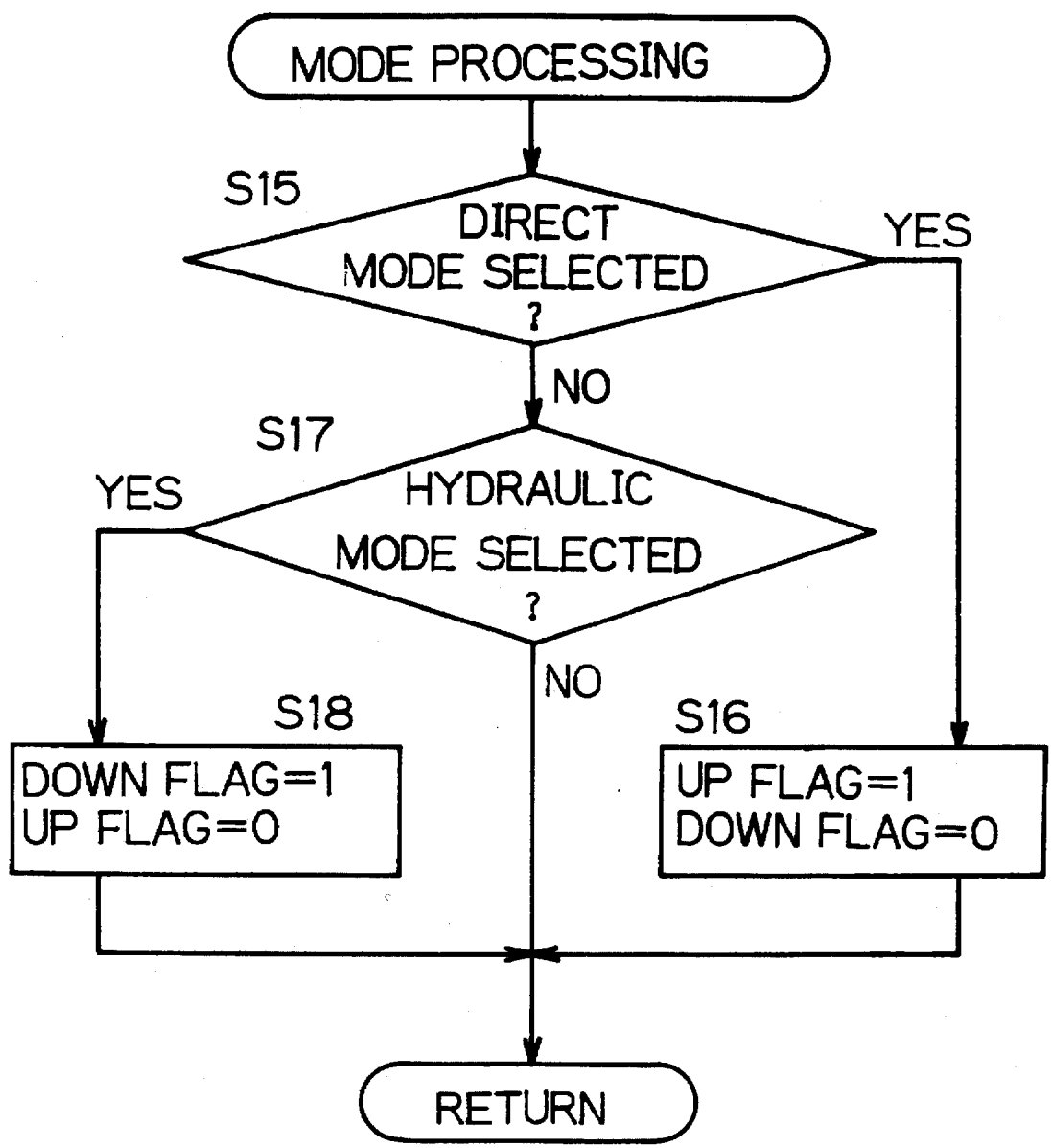
FIG. 10 is a flowchart of a Mode Processing subroutine from called during the control steps represented in FIG. 8.

Then, in the Mode processing, as shown in FIG. 10, it is determined at step S15 whether the transmission mode lever 56 is in the Up position or not indicating whether or not the Direct Mode is desired or not. When the switch 56 is determined to be in the Up position, the process shifts from step S15 to step S16, thereby setting an Up Flag to "1" and a Down Flag to "0". If it is determined at step S15 that the switch 56 is not in the Up position, the process shifts from step S15 to step S17. It is determined at step S17 whether switch is in the Down position or not. If the switch 56 is determined to be in the Down position, then the process shifts from step S17 to step S18, thereby setting the Down Flag to "1" and the Up Flag to "0".

Through such a Mode processing procedure, the selection of the transmission path when the transmission mode lever 56 is manipulated can be recognized.

Figure 11:
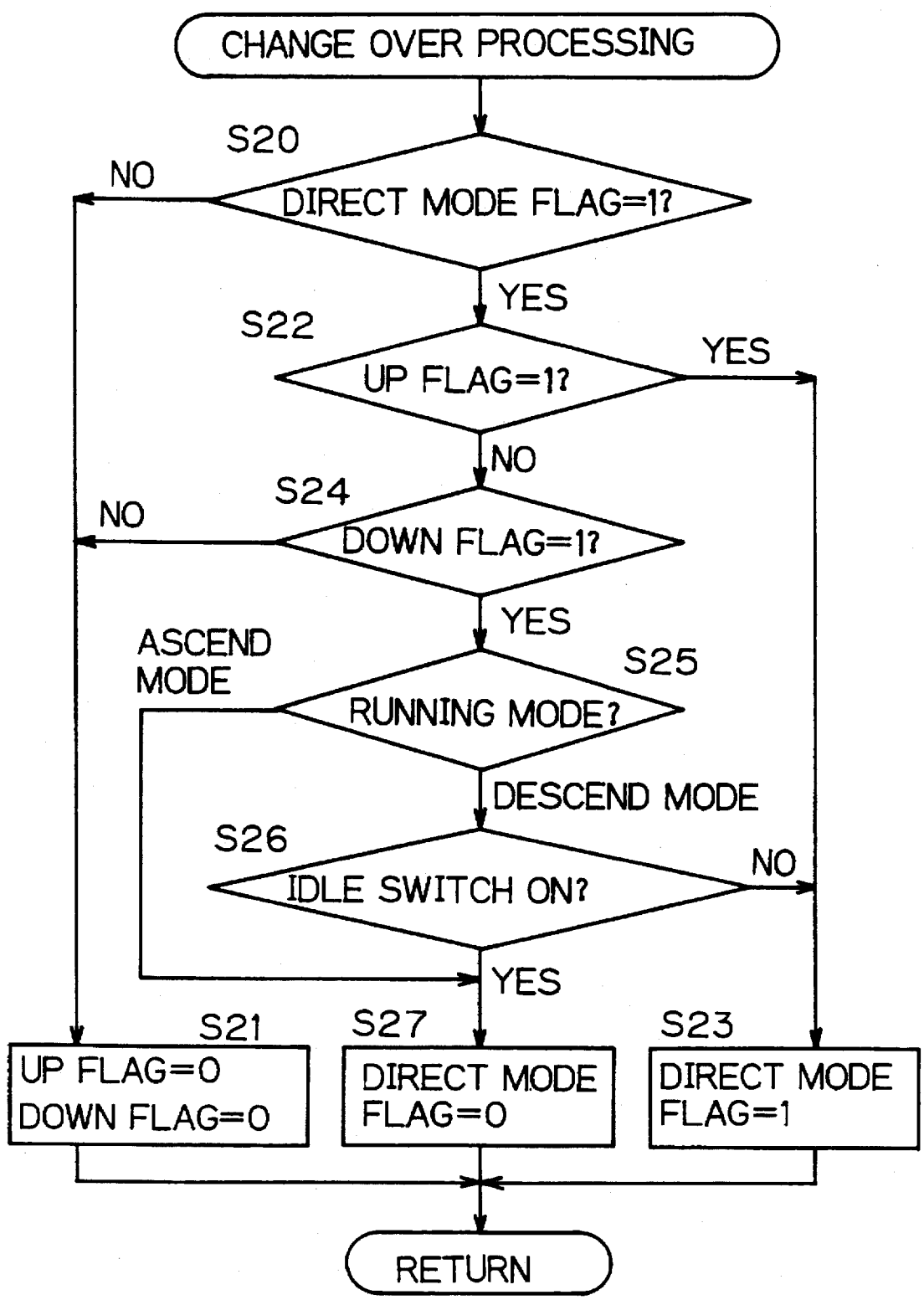
FIG. 11 is a flowchart of a Change-Over Processing subroutine from called during the control steps represented in FIG. 8.

In the change-over processing, as shown in FIG. 11, it is first determined at step S20 whether the Direct Mode flag is "1" or not. When the Direct Mode flag is not "1", the process is shifted from step S20 to step S21, thereby setting both the Up flag and the Down flag to "0", respectively. Also, when it is determined in step S20 that the Direct Mode flag is "1", the process is shifted from step S20 to step S22. It is determined at step S22 whether the Up Flag is "1" or not. If the Up Flag is determined to be "1", then the process shifts from step S22 to step S23, thereby setting the Direct Mode Flag to "1". When the Up Flag is not "1", the process is shifted from step S22 to step S24. It is judged at step S24 whether the Down Flag is "1" or not. If it is determined that the Down Flag is not "1", then the process shifts from step S24 to step S21. If it is determined that the Down Flag is "1", then the process shifts from step S24 to step S25. In step S25, it is determined at step S25 whether the running mode (switch 57) is set to Ascend Mode or Descend Mode. If the running mode is set for the Descend Mode, the process is shifted from step S25 to step S26 where it is determined whether the idle switch is on or not. If the foot of the driver is away from the accelerator, then the idling switch is on. In this case, the process is shifted from step S26 to step S27, thereby setting the Direct Mode flag to "0". Also, if it is determined in step S26 that the idle switch is not on (in the Descend Mode), the process shifts from step S26 to the step S23, thereby setting the Direct Mode flag to "1". On the other hand, id it is determined at step S25 that the running mode is the Ascend Mode, the process shifts from step S25 to step S27 skipping step S26.

Through such a change-over processing, when in the Direct Mode, the transmission mode lever 56 is switched over to the Down position, and additionally when it is in the Ascend Mode (due to the position of the switch 57), the control unit 50 changes operation over to the Hydraulic Mode. As a result, the torque force elevates by as much as the speed is decreased by the planetary gear unit 6. Also, in the Direct Mode, if the transmission mode lever 56 is changed over to the Down position, and the Descend Mode is set by the switch 57, and the idle switch is on, then operation is changed over to the Hydraulic Mode by the control unit 50. As a result, a powerful engine brake force is obtained. Conversely, even though operation is in the Descend Mode, when the idle switch is off, that is, the accelerator is effected, the control unit 50 changes operation to the Direct Mode. As a result, the engine brake is released.

Figure 12:
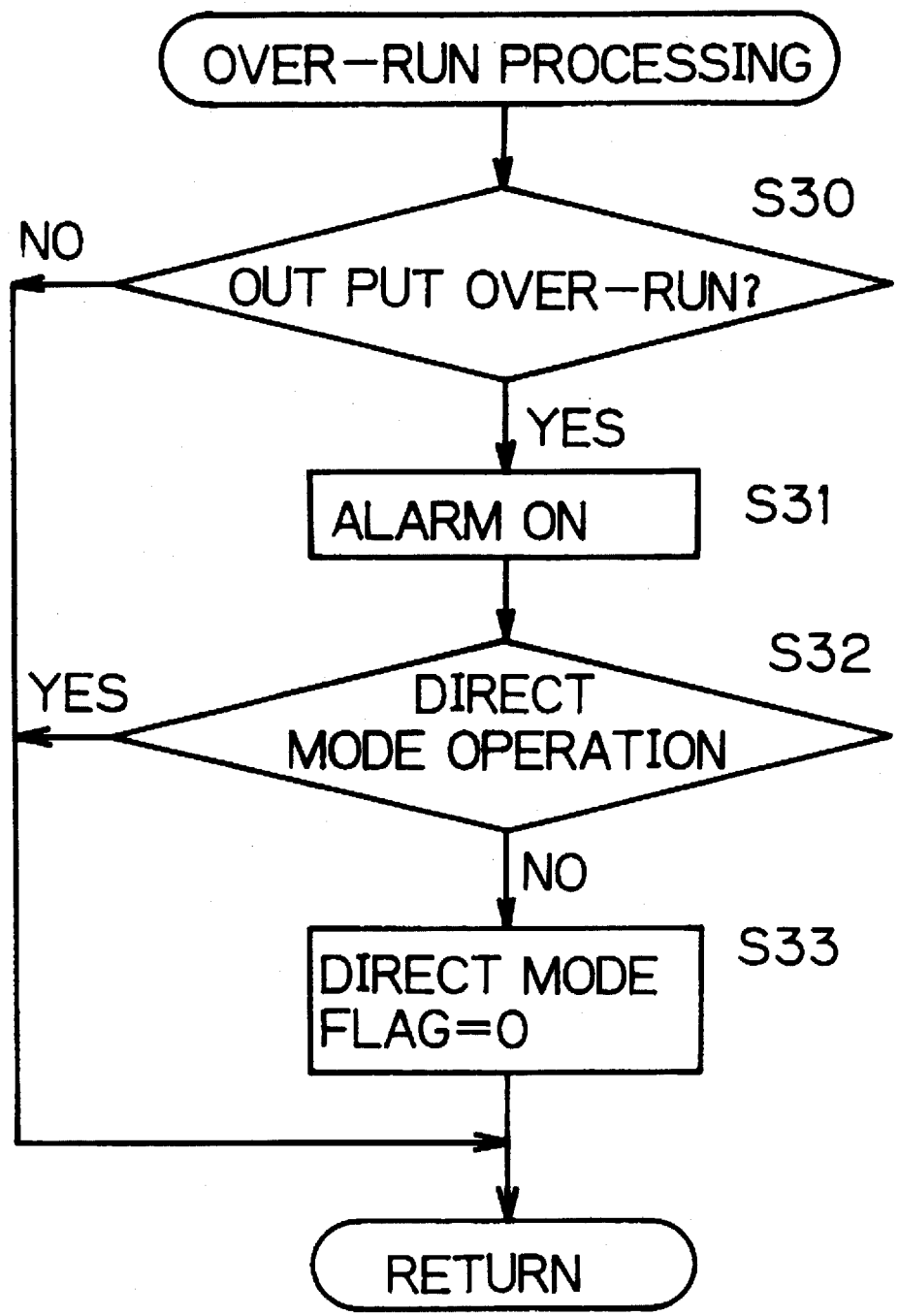
FIG. 12 is a flowchart of a Over-Run Processing subroutine from called during the control steps represented in FIG. 8.

Subsequently, in the over-run processing, as shown in FIG. 12, it is determined at step S30 whether the output r.p.m. from the sensor 53 exceeds a predetermined r.p.m., or not. When the former exceeds the latter, the process is shifted to step S31 where a processing of ringing an alarm buzzer is executed. Then, it is determined at step S32 whether operation is the Direct Mode or not. When it is not in the direct coupling state, the process is shifted from step S32 to step S33. At step S33, the Direct Mode flag is set to "0". As a result, a shift to the Direct Mode is inhibited, thereby preventing the engine from over-rotating.

ALTERNATE EMBODIMENT

At step S26 in the change-over control of the above-described embodiment, it is determined in the Descend Mode whether operation should continue in the Direct Mode or not depending on whether the idle switch 54 is on or not, that is, whether the driver steps on the accelerator or not. Instead, the operation mode may be controlled based upon whether the brake switch 55 is on or not.

In this case, when the driver steps on the accelerator in the Descend Mode, the process is shifted to step S27, thereby setting the Direct Mode Flag to "0". When the driver does not step on the accelerator, the process is shifted to step S23, thereby setting the Direct Mode Flag to "1". In other words, while descending a slope, when the driver steps on the accelerator, operation is shifted to the Hydraulic Mode, and when the driver's foot is apart from the accelerator, then operation is shifted to the Direct Mode.

SECOND ALTERNATE EMBODIMENT

Figure 14:
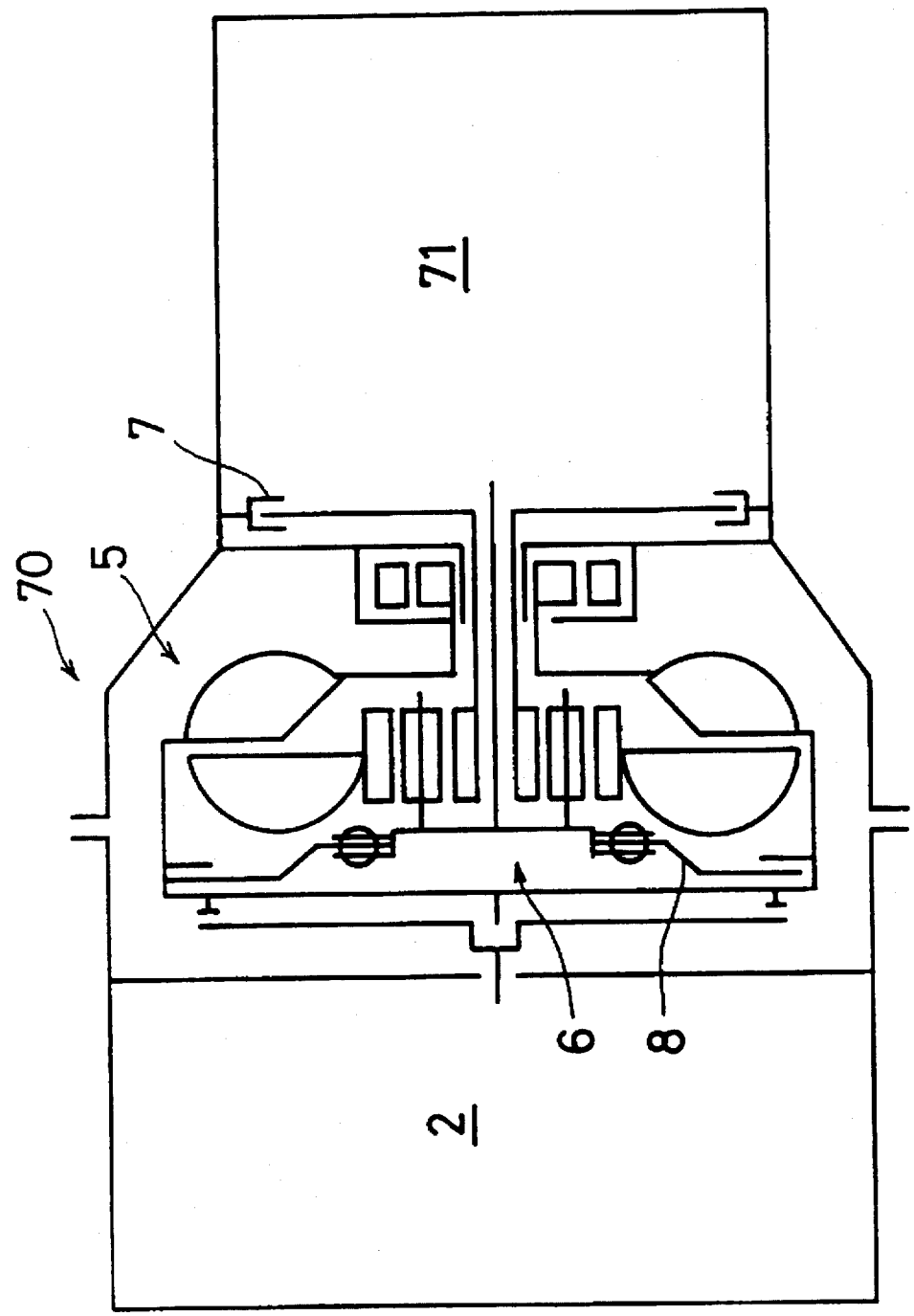
FIG. 14 is a schematic structural diagram similar to FIG. 1 showing a power transmission mechanism in accordance with an alternate embodiment of the present invention where the transmission is an automatic transmission.

Another alternate embodiment is shown in FIG. 14. In the second alternate embodiment, a vehicle includes an automatic transmission 71 connected a device in accordance with the present invention.

The power transmission mechanism 70 shown in FIG. 14 is disposed between an engine 2 and an automatic transmission 71, and mainly includes: a hydraulic coupling 5 to which a power is inputted from the engine 2; a planetary gear unit 6 that decreases the output rotating speed of the hydraulic coupling 5 to output it to the automatic transmission 71; a brake unit 7; and a direct coupling clutch unit 8 for directly transmitting the power from the engine 2 to the automatic transmission 71. The respective structural members are structured in nearly the same manner as those in the first embodiment described above, but in this embodiment, there is no dry clutch unit.

In this embodiment, the sun gear is fixed by the brake unit 7, whereby the rotating speed of the turbine of the hydraulic coupling 5 is decreased and then outputted to the turbine shaft, thus obtaining a propellant force as in the vehicle having a torque convertor.

Also, when effecting the engine brake, the rotating speed of the turbine shaft is increased and then transmitted to the turbine. For that reason, the turbine shaft is not rotated at so high speed, and only the turbine is rotated at high speed, thereby being capable of obtaining a sufficient brake force. In particular, when the capacity of the hydraulic coupling 5 is set as shown in FIG. 6, there can be obtained the capacity several times as much as that of the conventional torque convertor at the time of the engine brake operation.

As was described above, the present invention can obtain a small heat value and a large engine brake force.

Also, in the power transmission mechanism using the manual transmission unit, the operability can be improved without the clutch operation when starting the vehicle.

Further, the operability at the time of the change gear operation is improved by using the hydraulic coupling.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed:

1. A vehicle power transmission mechanism, comprising:
   a hydraulic coupling unit having a turbine and an impeller, said impeller configured to transmit torque to said turbine from an engine coupled to said impeller via a hydraulic fluid;
   a planetary gear unit connected to said turbine, said planetary gear unit couplable to a transmission, said planetary gear unit configured to decrease an output rotating speed of said turbine and transmit the rotating speed to said transmission, wherein said planetary gear unit comprises:
   a ring gear connected to said turbine, a plurality of planetary gears which are meshed with said ring gear radially within said ring gear, a carrier that supports said plurality of planetary gears and is coupled to said transmission, and a sun gear which is meshed with said plurality of planetary gears radially within said plurality of planetary gears; and
   a brake unit configured to selectively brake the rotation of said sun gear.

2. The vehicle power transmission mechanism as set forth in claim 1, further comprising:
   a direct coupling clutch connected to said turbine configured to selectively lock-up said turbine and said impeller such that said impeller and said turbine rotate as a single unit transmitting torque from the engine to said carrier of said planetary gear unit.

3. The vehicle power transmission mechanism as set forth in claim 2, further comprising a hydraulic control unit for controlling actuation of said brake unit and said direct coupled clutch unit.

4. The vehicle power transmission mechanism as set forth in claim 3, wherein said hydraulic control unit comprises a hydraulic pump which is driven by the rotation of said impeller, and a hydraulic control valve that controls the operation of said brake unit and the direct coupled clutch unit using hydraulic pressure generated by said hydraulic pump.

5. The vehicle power transmission mechanism as set forth in claim 1, further comprising:
   a mechanical dry clutch operably disposed between said carrier of said planetary gear unit and said transmission, for selectively controlling transmittance of torque from said carrier to said transmission; and
   wherein said transmission is a manual type transmission.

6. The vehicle power transmission mechanism as set forth in claim 1, wherein said transmission is an automatic type transmission.

7. The vehicle power transmission mechanism as set forth in claim 1, further comprising a flexible plate disposed between said engine and said hydraulic coupling unit.

8. The vehicle power transmission mechanism as set forth in claim 1, wherein said impeller and said turbine of said hydraulic coupling unit each include impeller blades and turbine blades, respectively, that guide direction of fluid flow of said hydraulic fluid in response to relative rotation of said impeller and said turbine, wherein said impeller blades are inclined in a negative direction with respect to a rotating direction of said impeller and said turbine and said turbine blades are inclined in a positive direction with respect to said rotating direction.

9. A vehicle power transmission mechanism, comprising:
   a hydraulic coupling unit having a turbine and an impeller, said impeller configured to transmit torque to said turbine from an engine coupled to said impeller via a hydraulic fluid;
   a planetary gear unit connected to said turbine, said planetary gear unit couplable to a manual transmission, said planetary gear unit configured to decrease an output rotating speed of said turbine and transmit the rotating speed to said manual transmission; and
   a mechanical dry clutch operably disposed between said planetary gear unit and said manual transmission, for selectively controlling transmittance of torque from said planetary gear unit to said manual transmission.

10. The vehicle power transmission mechanism as set forth in claim 9, wherein said planetary gear unit comprises:
    a ring gear connected to said turbine, a plurality of planetary gears which are meshed with said ring gear radially within said ring gear, a carrier that supports said plurality of planetary gears and is coupled to said transmission, and a sun gear which is meshed with said plurality of planetary gears radially within said plurality of planetary gears; and
    a brake unit configured to selectively brake the rotation of said sun gear.

11. The vehicle power transmission mechanism as set forth in claim 10, further comprising:

a direct coupling clutch connected to said turbine configured to selectively lock-up said turbine and said impeller such that said impeller and said turbine rotate as a single unit transmitting torque from the engine to said carrier of said planetary gear unit.

12. The vehicle power transmission mechanism as set forth in claim 11, further comprising a hydraulic control unit for controlling actuation of said brake unit and said direct coupled clutch unit.

13. The vehicle power transmission mechanism as set forth in claim 12, wherein said hydraulic control unit comprises a hydraulic pump which is driven by the rotation of said impeller, and a hydraulic control valve that controls the operation of said brake unit and the direct coupled clutch unit using hydraulic pressure generated by said hydraulic pump.

14. The vehicle power transmission mechanism as set forth in claim 12, wherein:

said hydraulic control unit is connected to a vehicle speed sensor, an idle switch and a mechanical mode switch having at least two positions, a first position for indicating a direct operation mode and a second position for indicating a hydraulic operation mode; and wherein said hydraulic control unit controls engagement and disengagement of said brake unit and said direct coupled clutch unit in response to conditions sensed by said vehicle speed sensor and said idle switch and the position of said mechanical mode switch.

15. The vehicle power transmission mechanism as set forth in claim 12, wherein:

said hydraulic control unit is connected to a vehicle speed sensor, a mechanical mode switch having at least two positions, a first position for indicating a direct operation mode and a second position for indicating a hydraulic operation mode and an ascend/descend switch having two positions, a first position indicating an ascending mode and a second position indicating a descending mode; and wherein said hydraulic control unit controls engagement and disengagement of said brake unit and said direct coupled clutch unit in response to conditions sensed by said vehicle speed sensor, the position of said mechanical mode switch and the position of said ascend/descend switch.

16. The vehicle power transmission mechanism as set forth in claim 12, wherein:

said hydraulic control unit is connected to a vehicle speed sensor, a brake switch and a mechanical mode switch having at least two positions, a first position for indicating a direct operation mode and a second position for indicating a hydraulic operation mode; and wherein said hydraulic control unit controls engagement and disengagement of said brake unit and said direct coupled clutch unit in response to conditions sensed by said vehicle speed sensor and an idle switch and the position of said mechanical switch.

17. The vehicle power transmission mechanism as set forth in claim 10, wherein said impeller and said turbine of said hydraulic coupling unit each include impeller blades and turbine blades, respectively, that guide direction of fluid flow of said hydraulic fluid in response to relative rotation of said impeller and said turbine, wherein said impeller blades are inclined in a negative direction with respect to a rotating direction of said impeller and said turbine and said turbine blades are inclined in a positive direction with respect to said rotating direction.

* * * * *